US011329689B1

(12) United States Patent
Rodenbeck

(10) Patent No.: US 11,329,689 B1
(45) Date of Patent: May 10, 2022

(54) ADAPTIVE SIGNAL SUPPRESSION USING A FEEDFORWARD WAVEFORM

(71) Applicant: The Government of the United States of America, as represented by the Secretary of the Navy, Arlington, VA (US)

(72) Inventor: Christopher T. Rodenbeck, Annandale, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/124,077

(22) Filed: Dec. 16, 2020

(51) Int. Cl.

| | |
|---|---|
| ***H04B 1/525*** | (2015.01) |
| ***H04B 1/00*** | (2006.01) |
| ***H04B 1/7107*** | (2011.01) |
| ***H04B 1/30*** | (2006.01) |
| ***H04B 1/04*** | (2006.01) |

(52) U.S. Cl.

CPC ........... *H04B 1/525* (2013.01); *H04B 1/0003* (2013.01); *H04B 1/04* (2013.01); *H04B 1/30* (2013.01); *H04B 1/7107* (2013.01); *H04B 2001/0408* (2013.01); *H04B 2001/307* (2013.01)

(58) Field of Classification Search

CPC ...... H04B 1/525; H04B 1/123; H04B 1/0475; H04B 15/00; H04B 1/56; H04B 15/02; H04B 17/21; H04B 17/14; H04B 17/345; H04B 17/354; H04B 1/0028; H04B 1/0032; H04B 1/0057; H04B 1/006; H04B 1/04; H04B 1/10; H04B 1/12; H04B 1/16; H04B 1/18; H04B 1/30; H03F 3/24; H03F 3/19; H03F 1/02; H03F 1/3241; H03F 2200/135; H03F 2200/144; H03F 2200/451; H03F 2203/45051; H03F 2203/45526; H03F 2203/45731; H03F 3/211; H03F 3/45179; H03F 3/45475; H03F 3/45636; H03F 3/45941

See application file for complete search history.

(56) References Cited

U.S. PATENT DOCUMENTS

| | | | | |
|---|---|---|---|---|
| 10,116,485 | B1 * | 10/2018 | Liu | H04B 17/17 |
| 2003/0203743 | A1 * | 10/2003 | Sugar | H04B 1/0057 455/550.1 |
| 2004/0041598 | A1 * | 3/2004 | Taki | H04B 1/18 327/113 |
| 2009/0186582 | A1 * | 7/2009 | Muhammad | H04B 1/525 455/63.1 |

(Continued)

*Primary Examiner* — Golam Sorowar

(74) *Attorney, Agent, or Firm* — US Naval Research Laboratory; William P. Ladd

(57) ABSTRACT

Systems and method are provided for canceling unwanted transmitter-to-receiver leakage in a coherent wireless system using a feedforward waveform that overcomes the limitations of purely analog or purely digital cancelation systems and methods. Systems and methods in accordance with embodiments of the present disclosure generate a software-defined waveform that, when fed forward into the receiver, effectively cancels the leakage. Embodiments of the present disclosure can use a defined cancelation waveform (e.g., a software-defined cancelation waveform) that can cancel multiple leakage paths at the same time.

20 Claims, 11 Drawing Sheets

(56) References Cited

U.S. PATENT DOCUMENTS

| | | | | |
|---|---|---|---|---|
| 2013/0344834 | A1* | 12/2013 | Souto Diez | H04B 1/16 455/245.1 |
| 2014/0364067 | A1* | 12/2014 | Hsieh | H04B 17/21 455/73 |
| 2016/0087658 | A1* | 3/2016 | Weissman | H04B 1/10 455/78 |
| 2018/0287719 | A1* | 10/2018 | Kanumalli | H04B 1/525 |
| 2020/0021327 | A1* | 1/2020 | Ciccarelli | H04B 1/525 |
| 2020/0295972 | A1* | 9/2020 | Hemo | H04B 7/0408 |

* cited by examiner

ADAPTIVE SIGNAL SUPPRESSION USING A FEEDFORWARD WAVEFORM

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 104112-US2

FIELD OF THE DISCLOSURE

This disclosure relates to transceiver systems, including leakage cancelation in transceiver systems.

BACKGROUND

In radio frequency (RF) systems, unwanted energy can "leak" from the transmitter to the receiver for a variety of reasons, including RF coupling onto direct current (DC) bias or control lines, finite duplexer isolation, mutual coupling between antennas, coupling paths around an airframe, reflections off nearby structures or from close-in clutter. In traditional communications applications, transmitter-to-receiver (TX-to-RX) coupling can be mitigated by operating the transmitter and receiver at different frequencies so that undesired transmitter energy can be filtered out. Current wireless communications research and development has focused on achieving simultaneous transmit and receive (STAR) at the same frequency to effectively double the available bandwidth. Unfortunately, STAR requires very high receiver dynamic range to prevent the transmitter from desensitizing the receiver. This tradeoff has thus far limited the use of STAR in consumer wireless applications.

The situation is even more challenging in radar applications. In coherent radar (as well as in passive RFID), the transmit and receive signals are at the same frequency and are highly correlated with each other. This makes it easy for the transmitter to "jam" its own receiver, whether from leakage inside the radar, from "ringing" in the antenna front end, from "sneak paths" around the radar vehicle, or from reflections off nearby scatterers. This self-jamming issue can be mitigated, with performance tradeoffs, by pulsing the transmit signal and time gating the receiver, but even then leakage still is an important design issue, especially if the radar has considerable coherent processing gain or needs to detect targets over a wide range of ranges or velocities.

The problem of TX-to-RX leakage becomes highly problematic in situations where multiple transmitters and receivers are co-located and operating simultaneously. Examples of this are wide ranging, from multifunction communications base stations to naval vessels. Current leakage cancelation techniques rely on classical analog or digital approaches. Analog cancelation circuits intentionally feed a portion of the transmit signal forward into the receiver. If the feedforward signal's phase and amplitude are correctly adjusted, it will cancel unintentional TX-to-RX leakage. Unfortunately, this only works if the undesired TX-to-RX leakage is due to a single leakage path corresponding to a particular phase delay. If there are multiple leakage signals or multiple leakage paths (which is common), the analog feedforward signal will only be able to cancel one of them. Digital cancelation techniques can also subtract the effect of TX-to-RX leakage, but this operation takes place in the digital domain after the superimposed receive signal and leakage/interference have already been digitized. If the leakage/interference desensitizes the receiver before digitization (which is common), then digital cancelation techniques cannot compensate for this.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 10:
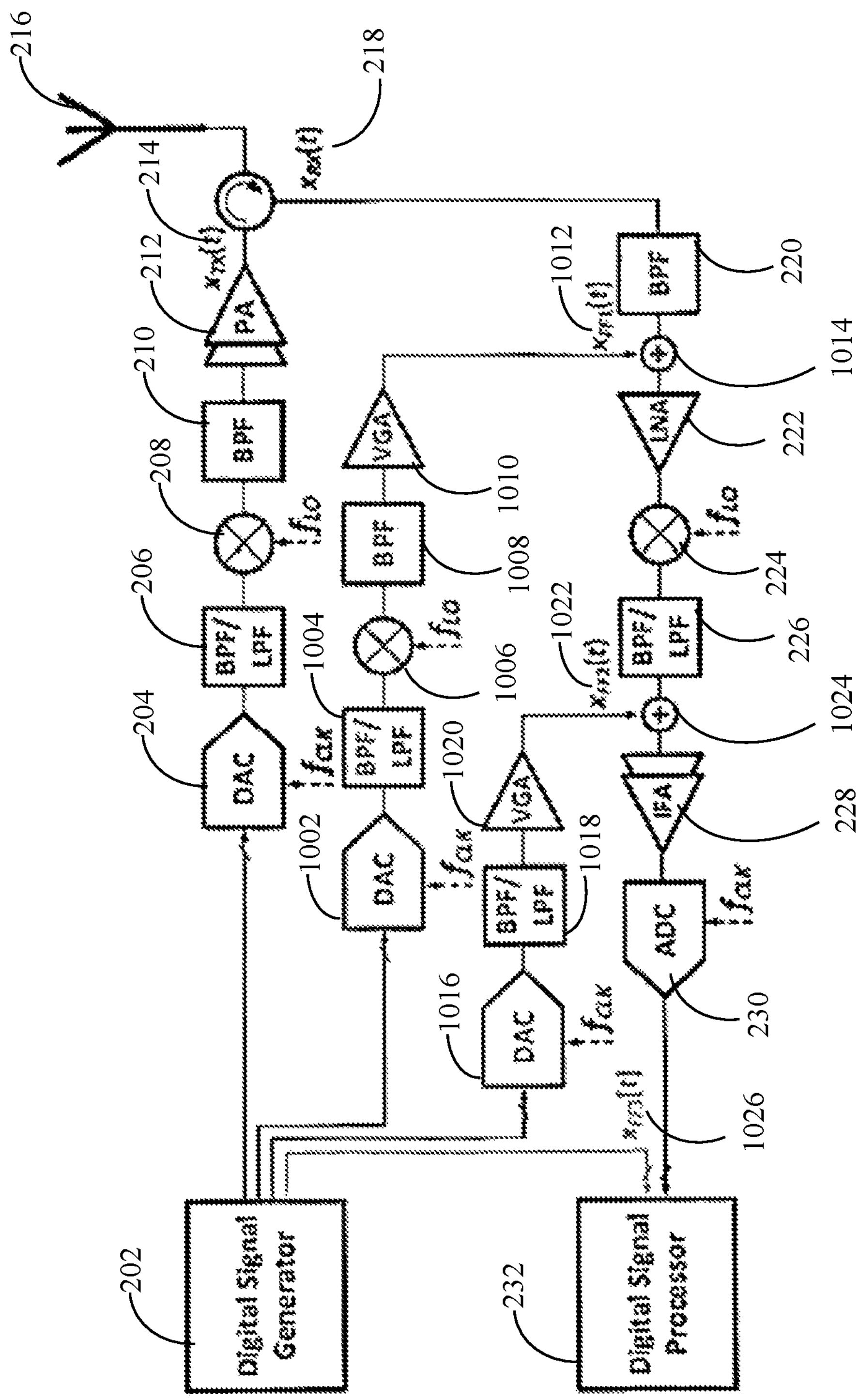
Figure 11:
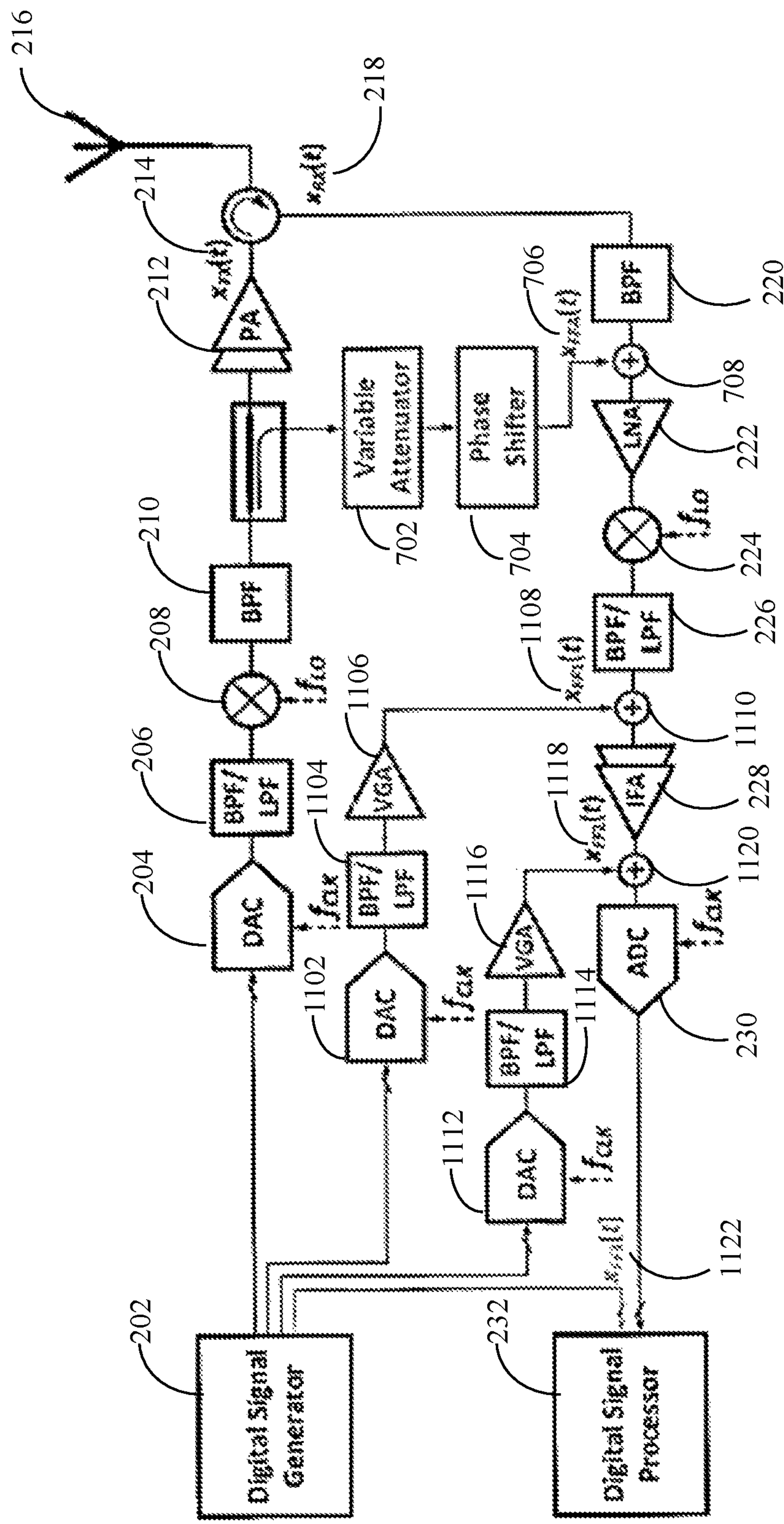

FIG. 10 shows a block diagram of an exemplary radar transceiver in which an additional cancelation signal feeds forward into the RF section of the receiver in accordance with another embodiment of the present disclosure; and FIG. 11 shows a block diagram of an exemplary radar transceiver in which an analog feedforward signal is used in the RF section of the receiver in accordance with another embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods for canceling unwanted transmitter-to-receiver leakage in a coherent wireless system using a feedforward waveform that overcomes the limitations of purely analog or purely digital cancelation systems and methods. Systems and methods in accordance with embodiments of the present disclosure generate a software-defined waveform that, when fed forward into the receiver, effectively cancels the leakage. Embodiments of the present disclosure can use a defined cancelation waveform (e.g., a software-defined cancelation waveform) that can cancel multiple leakage paths at the same time.

Unlike purely digital cancelation techniques, a software-defined cancelation waveform can cancel leakage in the receiver prior to quantization or prior to intermediate frequency (IF) amplification, or even prior to low-noise amplification. This can significantly reduce linearity constraints in high-sensitivity coherent receivers in which dynamic range is typically limited by clutter, leakage, or interferers rather than by uncorrelated noise.

An efficient implementation of this technique could blend analog, digital and software-defined approaches to maximize receiver dynamic range for the lowest possible hardware cost. The technique can be extended to adaptively cancel multiple unwanted signals due to leakage, clutter, interferers or blockers. Exemplary applications include: (1) the suppression of transmitter-to-receiver leakage in radar and radio-frequency identification (RFID); (2) the suppression of blockers in Global Positioning System (GPS) systems; (3) the suppression of co-site interference in multifunction wireless platforms; and (4) the enablement of simultaneous transmit and receive in wireless/cellular communications.

2. Energy Leakage in RF Systems

Figure 1:
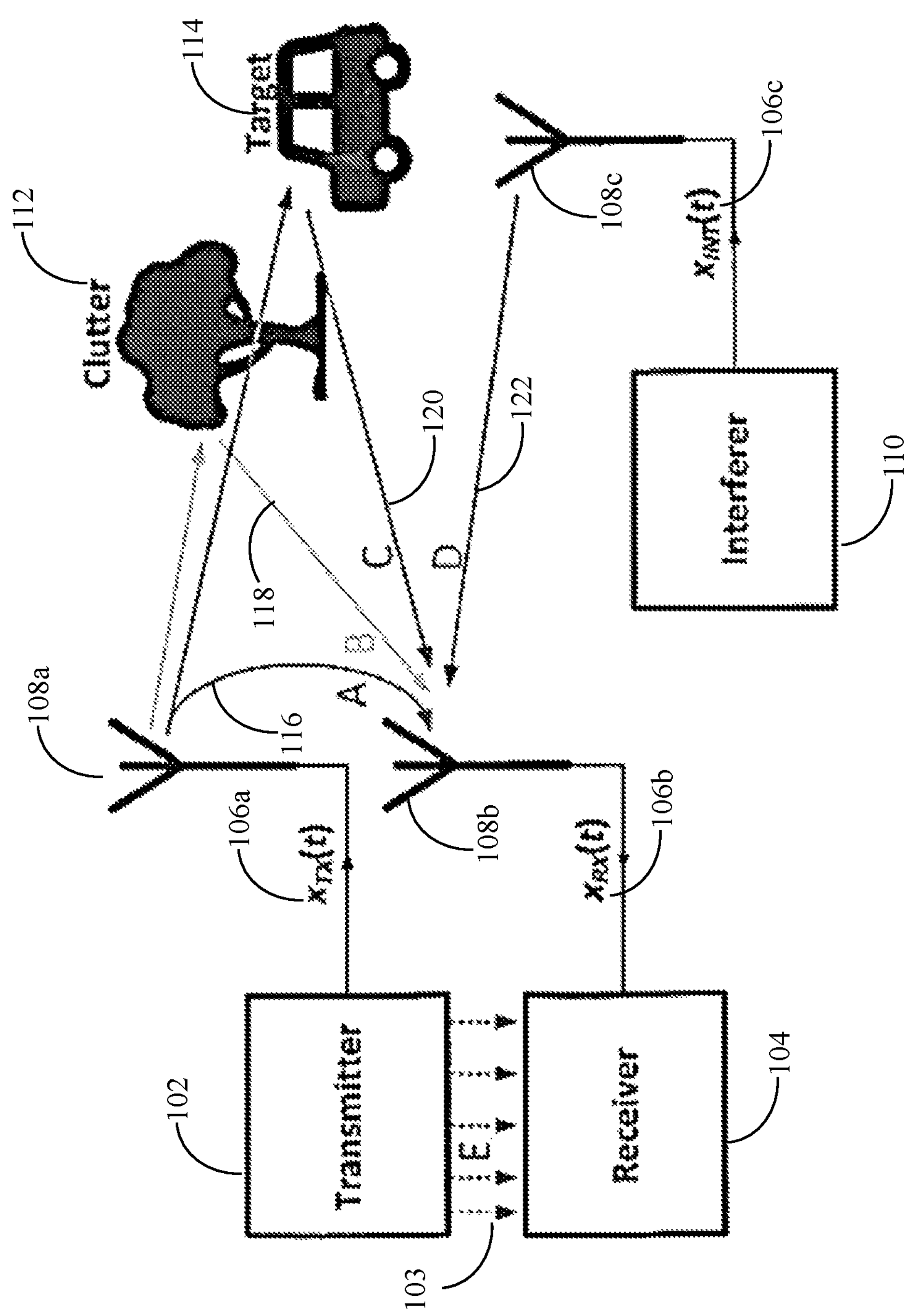
FIG. 1 is a diagram showing an example of leaking of unwanted energy in an RF system from a variety of sources.

FIG. 1 is a diagram showing an example of leaking of unwanted energy in an RF system from a variety of sources. In FIG. 1, a transmitter 102 transmits a signal 106*a* to a transmit antenna 108*a*, and a receiver 104 receives a signal 106*b* from a receive antenna 108*b*. FIG. 1 shows leakage 103 between transmitter 102 and receiver 104 that is internal to the transmitter-receiver electronics subsystem. FIG. 1 also shows direct leakage 116 from transmit antenna 108*a* to receive antenna 108*b* due to mutual coupling, "sneak paths" around the surrounding structure, etc. In FIG. 1, there are also reflections 118 from unintended targets or "clutter" 112. For example, in FIG. 1, a signal from transmit antenna 108*a* is reflected from clutter 112 to receive antenna 108*b*. Additionally, in FIG. 1, a signal from transmit antenna 108*a* reflects 120 from the desired target 114 to receive antenna 108*b*. FIG. 1 also shows an interferer 110 that transmits an interfering signal 106*c* to an interferer antenna 108*c*. In FIG. 1, interferer antenna 108*c* sends an interfering transmission 122 to receive antenna 108*b*.

3. Exemplary Transceiver Systems

Figure 2:
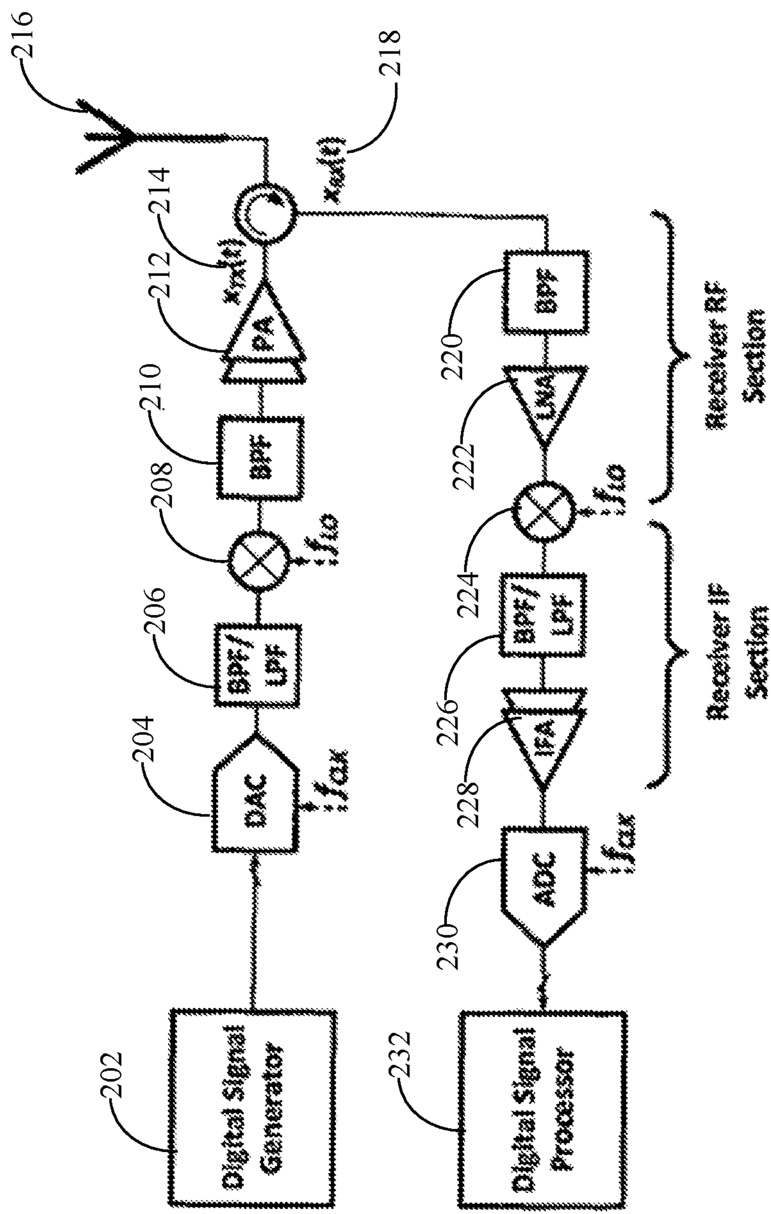
FIG. 2 shows a block diagram of an exemplary radar transceiver in accordance with an embodiment of the present disclosure.

FIG. 2 shows a block diagram of an exemplary radar transceiver in accordance with an embodiment of the present disclosure. It should be understood that the typology of FIG. 2 is exemplary, and many transceiver topologies can be used in accordance with embodiments of the present disclosure. In FIG. 2, a digital signal generator 202 and digital-to-analog converter (DAC) 204 generate a baseband waveform that is filtered by a bandpass or lowpass filter (BPF or LPF) 206, upconverted by a mixer 208 and another BPF 210, and amplified by a power amplifier (PA) 212 to create a transmit signal $X_{TX}(t)$ 214. The transmit signal 214 is radiated from an antenna 216, reflected from a target, and received back at antenna 216. The receive signal $X_{RX}(t)$ 218 is filtered by BPF 220, amplified by a low noise amplifier (LNA) 222, downconverted by mixer 224, filtered by BPF/LPF 226, amplified by an intermediate frequency amplifier (IFA) 228, and digitized by an analog-to-digital converter (ADC) 230 for processing in a digital signal processor (DSP) 232.

The transceiver of FIG. 2 can be divided into a radiofrequency (RF) section and an intermediate frequency (IF) section. Although the block diagram of FIG. 2 shows that the transmitter and receiver use an identical clock frequency $f_{CLK}$ and local oscillator frequency $f_{LO}$, these signals do not need to be identical as long as they are synchronous. Note that, although quadrature or IQ processing is not shown for simplicity, this is in no way a limitation in the following discussion.

Figure 3:
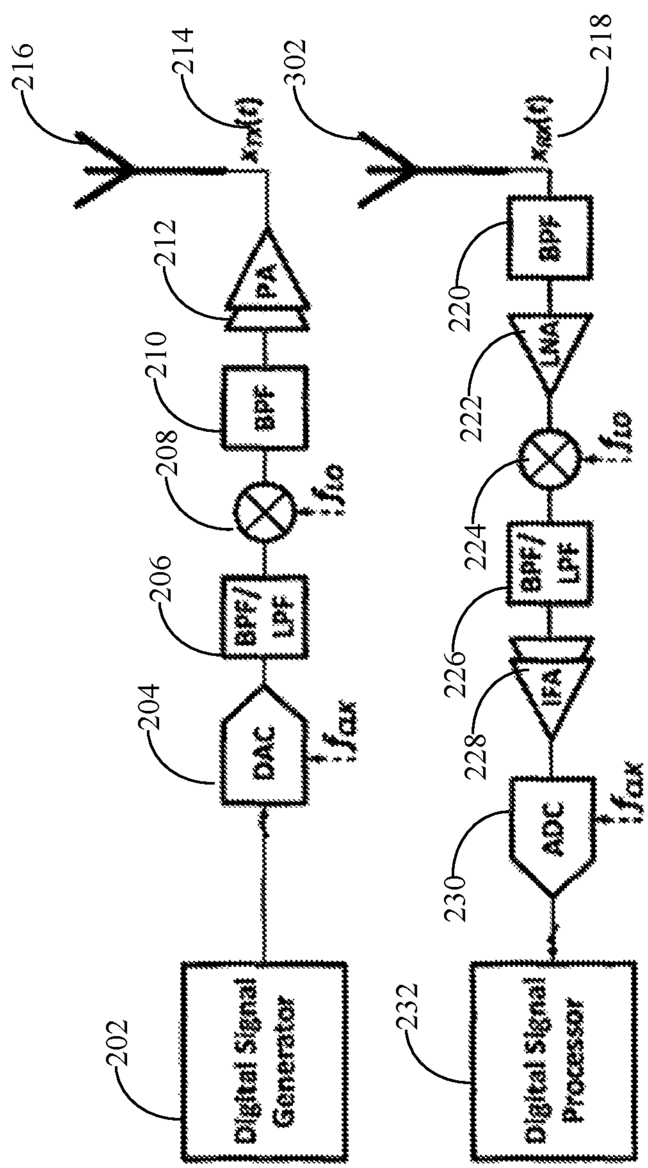
FIG. 3 shows a block diagram of an exemplary radar transceiver in accordance with another embodiment of the present disclosure.

FIG. 3 shows a block diagram of an exemplary radar transceiver in accordance with another embodiment of the present disclosure. In FIG. 3, the transmit and receive paths use separate antennas. For example, FIG. 3 includes receive antenna 302, which receives receive signal $X_{RX}(t)$ 218.

4. Exemplary Transceiver Systems Using Cancelation Signals

Figure 4:
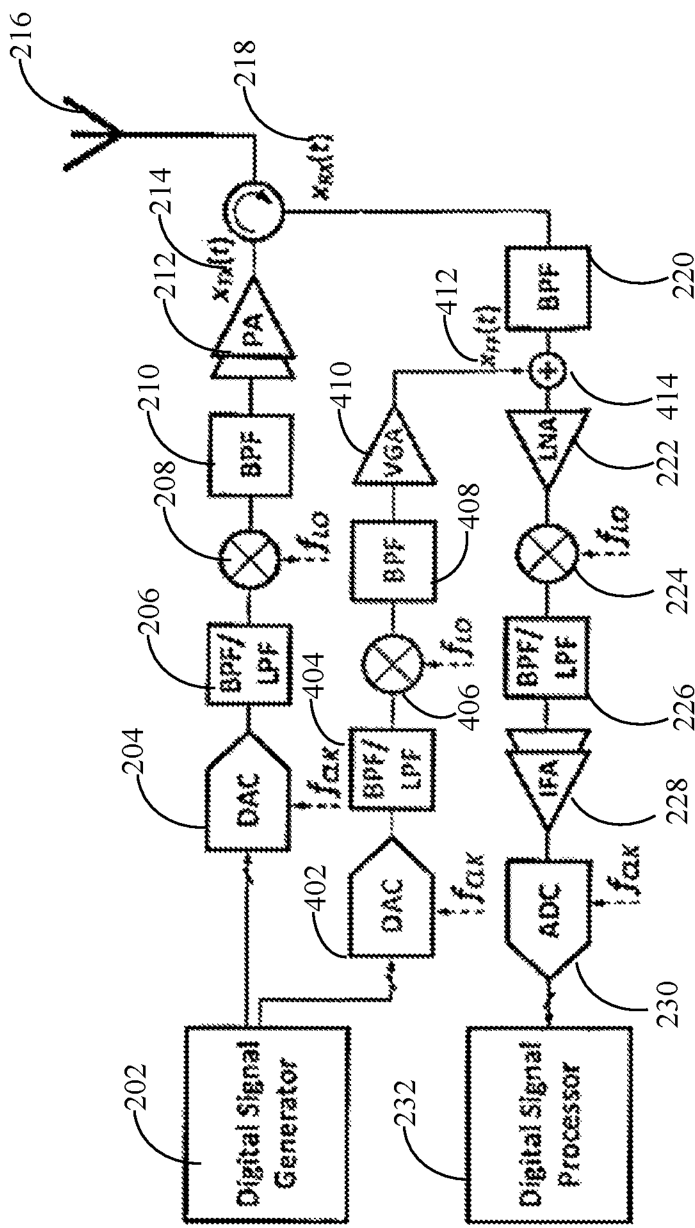
FIG. 4 shows a block diagram of an exemplary radar transceiver in accordance with another embodiment of the present disclosure.

FIG. 4 shows a block diagram of an exemplary radar transceiver in accordance with another embodiment of the present disclosure. In FIG. 4, a cancelation signal (e.g., in an embodiment, a software-defined feedforward cancelation signal) is fed forward from the transmitter and injected before LNA 222 in the receiver. In FIG. 4, digital signal generator 202 drives a second DAC 402 to create a cancelation waveform $X_{FF}(t)$ 412 that is fed forward into the receiver to cancel undesired leakage. In FIG. 4, the signal from DAC 402 is filtered by a BPF/LPF 404, mixed by a mixer 406, filtered by a BPF 408, amplified by a variable gain amplifier (VGA) 410 to create $X_{FF}$(t) 412. In FIG. 4, $X_{FF}$(t) 412 is injected 414 into the signal from BPF 220, and the combined signal is passed to LNA 222. Although VGA 410 is shown to increase the dynamic range of the feedforward signal beyond the dynamic range of DAC 402, VGA 410 is not necessary in accordance with embodiments of the present disclosure. For example, in an embodiment, a variable attenuator can also be used, or no variable amplifier/attenuator may be needed at all depending, for example, on the cost/performance tradeoff of DAC 402.

For the topology shown in FIG. 4, cancelation waveform $X_{FF}$(t) 412 is injected before LNA 222. This has the advantage of preventing leakage or interferers from desensitizing the gain of LNA 222. One drawback to this approach is the potential to reduce receiver noise figure by introducing loss before LNA 222 by the addition of the feedforward coupling circuit. To mitigate that issue, the injection point could be moved after LNA 222 or between two LNA stages. Another drawback to injecting the feedforward signal in the receiver RF stage is that, in an embodiment, the feedforward DAC 402 and upconverter operate at the same bandwidth and carrier frequency as the transmitter, which could increase size, cost, power consumption, etc. Furthermore, this arrangement could be prohibitively complex in many active phased array applications in which numerous receive antennas are connected to numerous receive chains.

Figure 5:
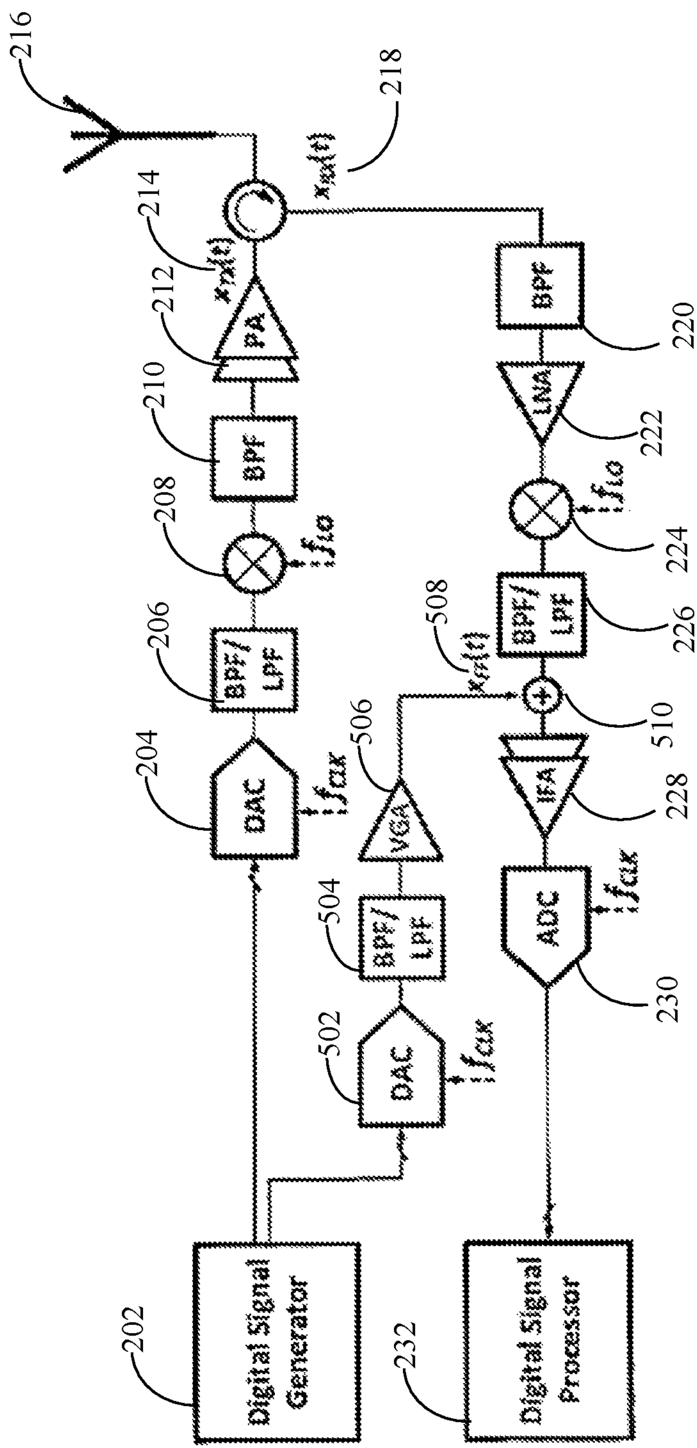
FIG. 5 shows a block diagram of an exemplary radar transceiver in accordance with another embodiment of the present disclosure.

FIG. 5 shows a block diagram of an exemplary radar transceiver in accordance with another embodiment of the present disclosure. In FIG. 5, a cancelation signal (e.g., in an embodiment, a software-defined feedforward cancelation signal) $X_{FF}$(t) 508 is injected before IFA 228. In this case, the cancelation signal $X_{FF}$(t) 508 may not prevent receiver degradation in the receiver RF section, but can prevent leakage/interference from reducing the dynamic range of IFA 228 and ADC 230, where receiver dynamic range is typically most highly constrained. Specifically, in FIG. 5, digital signal generator 202 drives a second DAC 502 to create a cancelation waveform $X_{FF}$(t) 508 that is fed forward into the receiver to cancel undesired leakage. The signal from DAC 502 is filtered by a BPF/LPF 504 and amplified by VGA 506 to create $X_{FF}$(t) 508. In FIG. 5, $X_{FF}$(t) 508 is injected 510 into the signal from BPF/LPF 226, and the combined signal is passed to IFA 228.

This approach has several advantages. For example, the required bandwidth and sample rate of ADC 230 are significantly reduced in comparison to the transmit chain. Additionally, there is no significant impact on receiver noise figure. Further, in a phased array in which multiple active antenna signals combine at IF, only one feedforward cancelation signal is required. Variations on this topology include injecting the feedforward signal between IFA stages or immediately before ADC 230 stage, as illustrated in FIG. 6.

Figure 6:
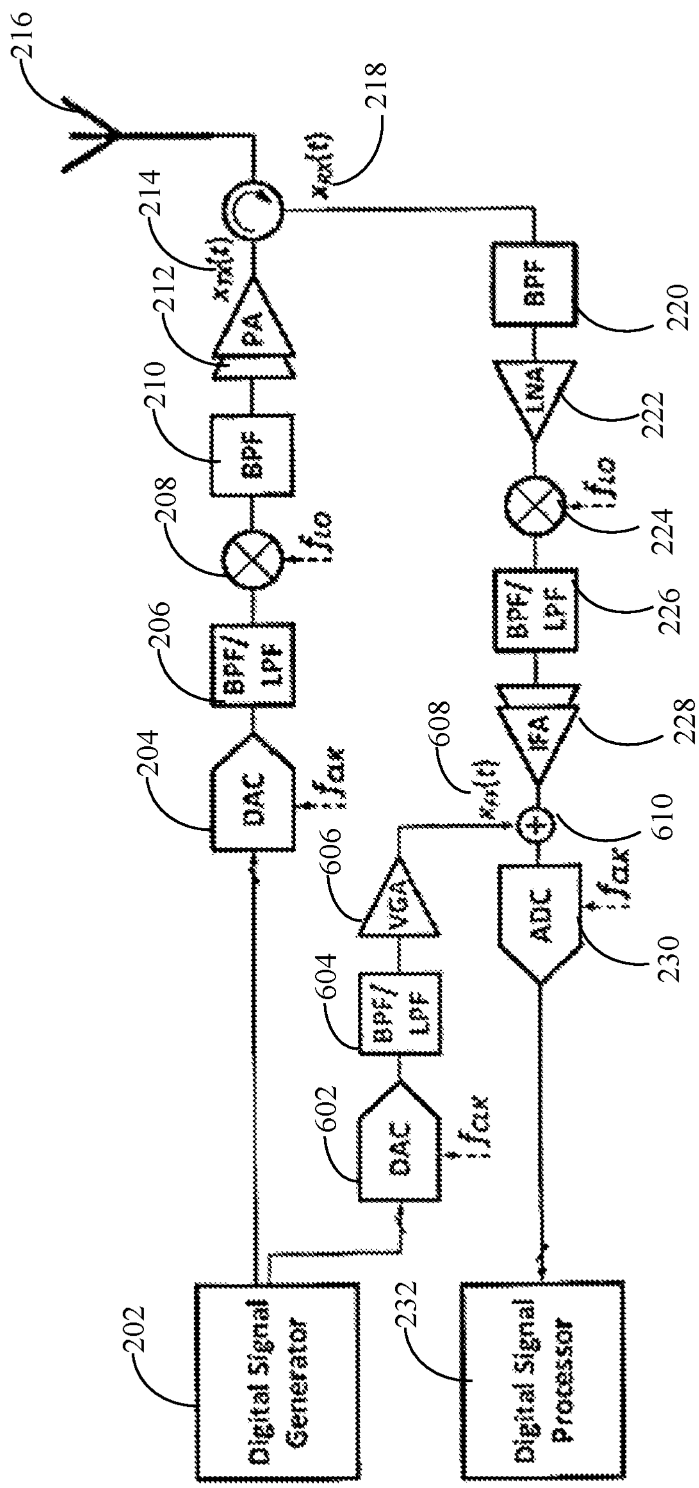
FIG. 6 shows a block diagram of an exemplary radar transceiver in accordance with another embodiment of the present disclosure.

FIG. 6 shows a block diagram of an exemplary radar transceiver in accordance with another embodiment of the present disclosure. In FIG. 6, a cancelation signal (e.g., a software-defined feedforward cancelation signal) is injected before ADC 230. Specifically, in FIG. 6, digital signal generator 202 drives a second DAC 602 to create a cancelation waveform $X_{FF}$(t) 608 that is fed forward into the receiver to cancel undesired leakage. The signal from DAC 602 is filtered by a BPF/LPF 604 and amplified by VGA 606 to create $X_{FF}$(t) 608. In FIG. 6, $X_{FF}$(t) 608 is injected 610 into the signal from IFA 228, and the combined signal is passed to ADC 230.

Figure 7:
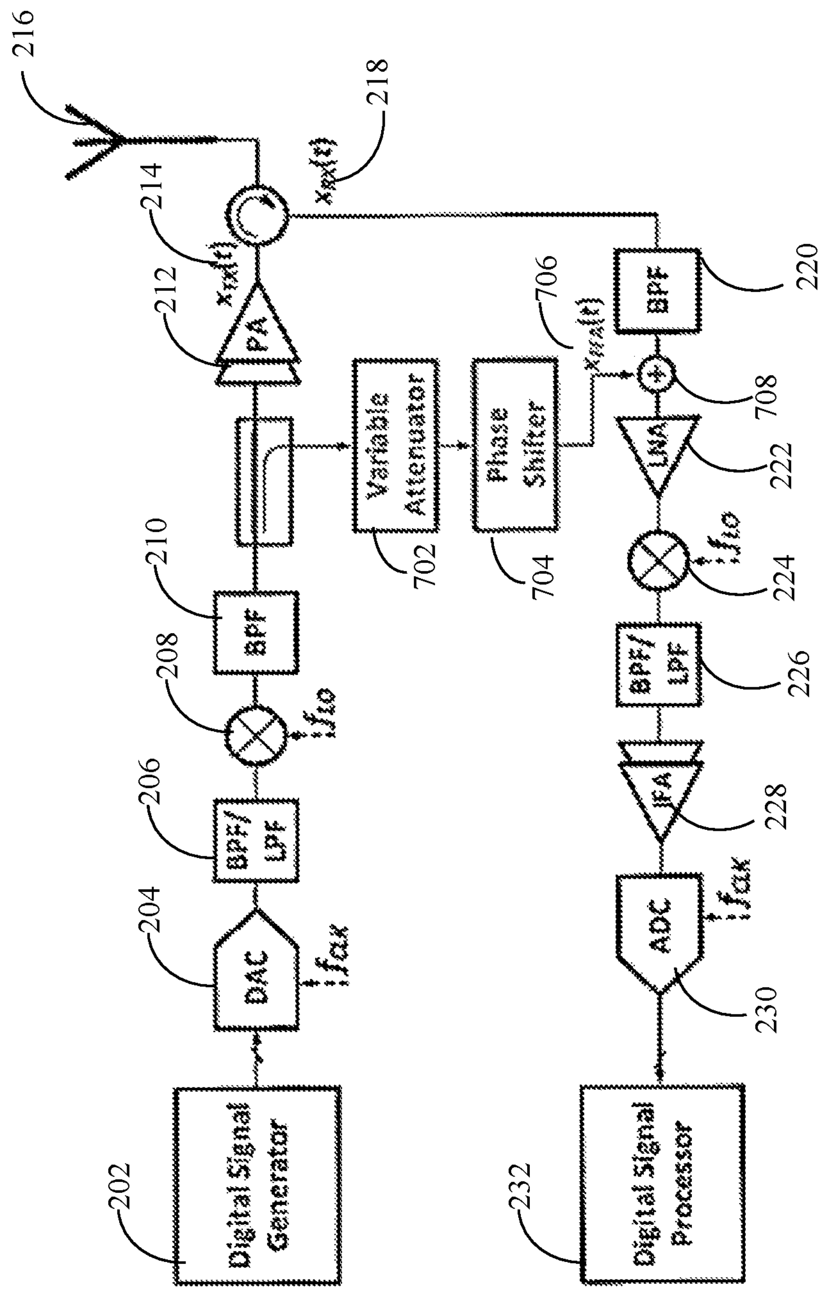
FIG. 7 shows a block diagram of an exemplary radar transceiver using an analog cancelation signal in accordance with another embodiment of the present disclosure.

FIG. 7 shows a block diagram of an exemplary radar transceiver using an analog cancelation signal in accordance with another embodiment of the present disclosure. In FIG. 7, variable attenuator 702 and phase shifter 204 are used to generate cancelation signal $X_{FFA}$(t) 706. In FIG. 7, $X_{FFA}$(t) 706 is injected 708 into the signal from BPF 220, and the combined signal is passed to LNA 222.

Figure 8:
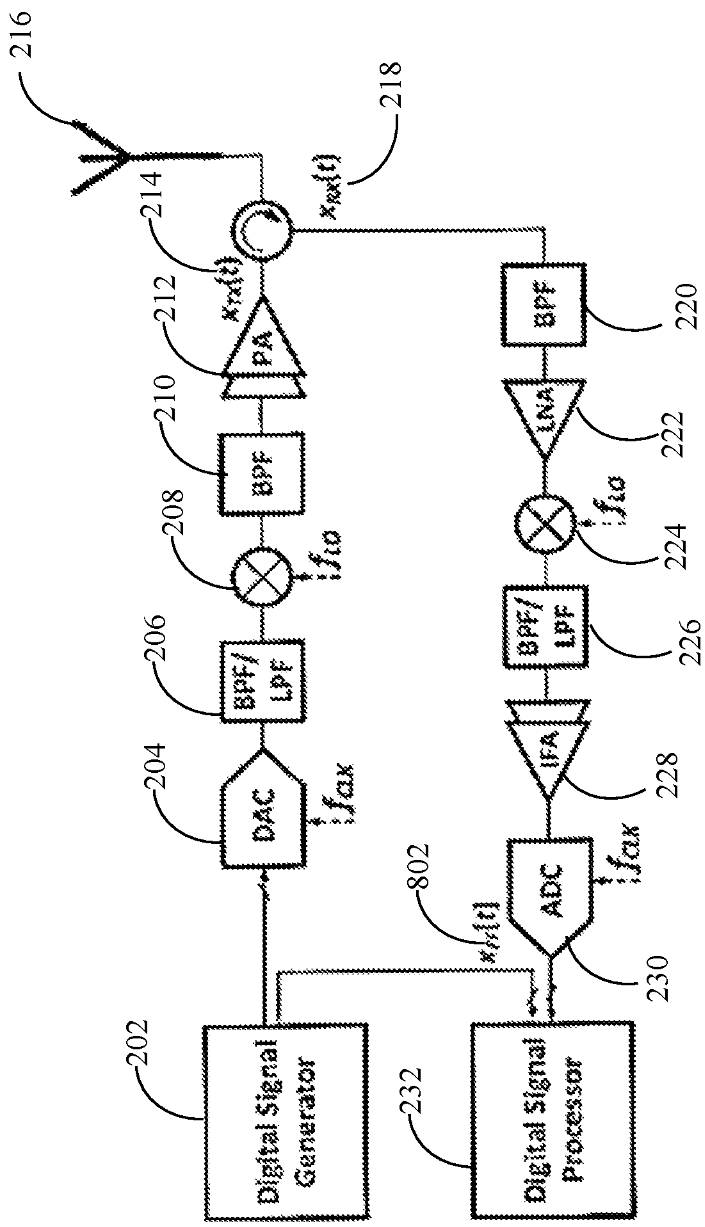
FIG. 8 shows a block diagram of an exemplary radar transceiver using a digital cancelation signal in accordance with another embodiment of the present disclosure.

FIG. 8 shows a block diagram of an exemplary radar transceiver using a digital cancelation signal in accordance with another embodiment of the present disclosure. In FIG. 8, digital signal generator 202 generates cancelation signal $X_{FF}$(t) 802, which is passed to DSP 232.

As discussed above, in an embodiment, the analog approach of FIG. 7 can cancel one leakage path at a time, and in an embodiment, the digital approach of FIG. 8 does not correct for receiver degradation due to leakage in the RF or IF sections or in ADC 230. In contrast, a software-defined waveform in accordance with embodiments of the present disclosure can be designed to cancel undesired electromagnetic energy due to the superposition of numerous leakage paths and/or interferers, blockers, etc. Furthermore, the software defined waveform can be injected at any point in the receiver RF or IF section prior to quantization at ADC 230.

Figure 9:
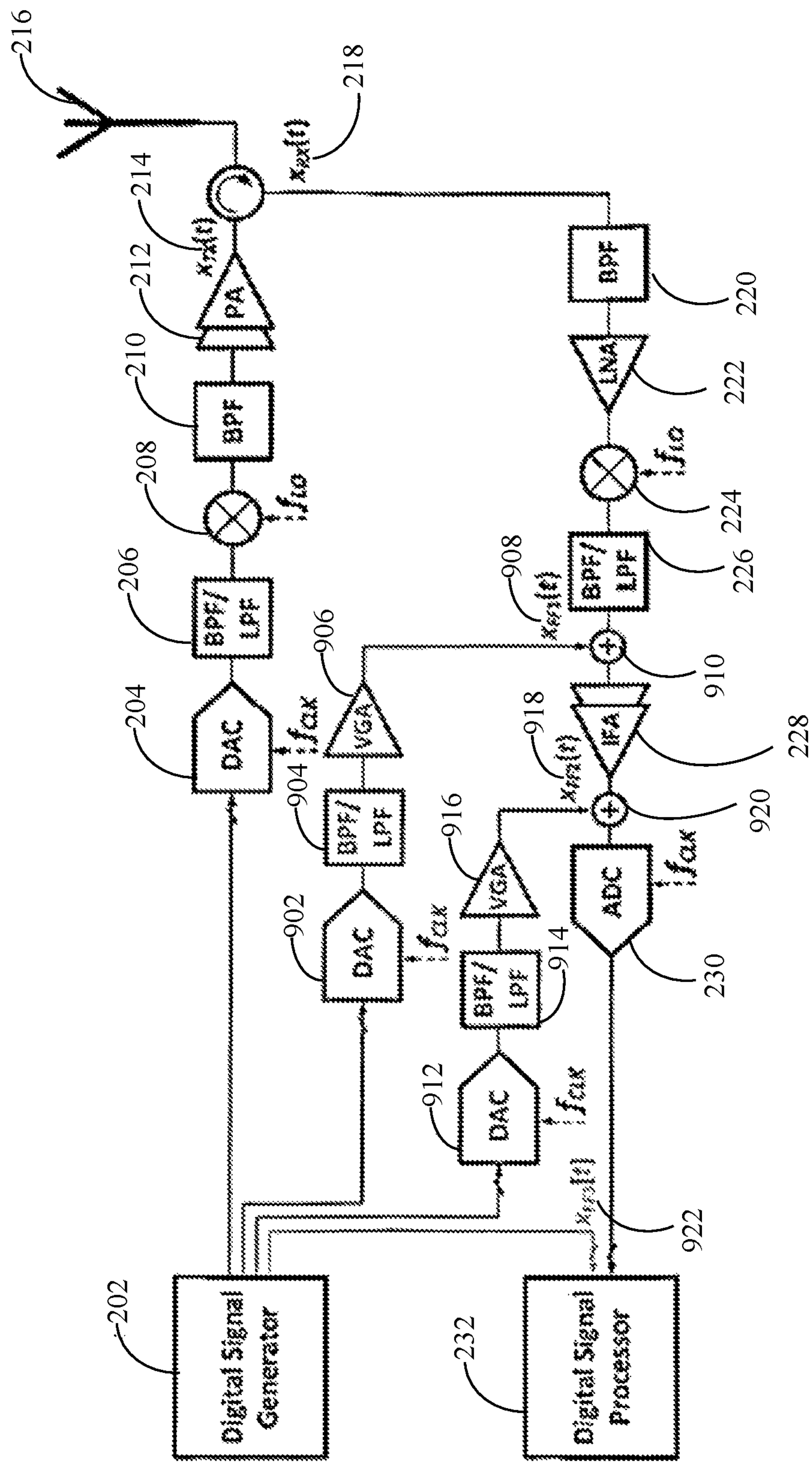
FIG. 9 is a block diagram illustrating a cancelation approach in which two cancelation waveforms (e.g., software-defined cancelation waveforms) feed forward into the receiver IF section in accordance with an embodiment of the present disclosure.

An important variation of a software defined approach in accordance with an embodiment of the present disclosure is the combination of any of the above approaches. For example, FIG. 9 is a block diagram illustrating a cancelation approach in which two cancelation waveforms (e.g., software-defined cancelation waveforms) feed forward into the receiver IF section in accordance with an embodiment of the present disclosure. In FIG. 9, one cancelation waveform $X_{FF1}$(t) 908 is fed forward before IFA 228, and another cancelation waveform $X_{FF2}$(t) 920 is fed forward after IFA 228.

The approach of FIG. 9 could be useful to extend the dynamic range of the cancelation, especially in radar applications in which receiver dynamic range can exceed 150 dB. In an embodiment, the waveform injected before IFA 228 could more effectively cancel high-level leakage/interferers, and the waveform injected after the IFA could then "clean up" by canceling lower level leakage/interferers. In an embodiment, an additional digital cancelation signal $X_{FF3}$(t) 922 feeding forward directly into DSP 232 could then provide additional cancelation of very low level leakage/interferers that, for example, may only be observable after coherent processing gain.

Specifically, in FIG. 9, digital signal generator 202 drives a second DAC 902. The signal from DAC 902 is filtered by a BPF/LPF 904 and amplified by VGA 906 to create $X_{FF1}$(t) 908. In FIG. 6, $X_{FF1}$(t) 908 is injected 910 into the signal from BPF/LPF 226, and the combined signal is passed to IFA 228. Additionally, in FIG. 9, digital signal generator 202 drives a third DAC 912. The signal from DAC 912 is filtered by a BPF/LPF 914 and amplified by VGA 916 to create $X_{FF2}$(t) 918. In FIG. 9, $X_{FF2}$(t) 918 is injected 920 into the signal from IFA 228, and the combined signal is passed to ADC 230. In FIG. 9, digital signal generator 202 also generates cancelation signal $X_{FF3}$(t) 922, which feeds forward into DSP 232.

FIGS. 10 and 11 show extensions of the topology of FIG. 9 in accordance with embodiments of the present disclosure in which either a software-defined waveform or an analog waveform coupled from the transmitter are used to cancel very high level leakage/interferers in the RF section of the receiver. FIG. 10 shows a block diagram of an exemplary radar transceiver in which an additional cancelation signal feeds forward into the RF section of the receiver in accordance with another embodiment of the present disclosure. Specifically, in FIG. 10, digital signal generator 202 drives a second DAC 1002. The signal from DAC 1002 is filtered by a BPF/LPF 1004, mixed by mixer 1006, filtered by BPF 1008, and amplified by VGA 1010 to create cancelation signal $X_{FF1}$(t) 1012. In FIG. 6, $X_{FF1}$(t) 1012 is injected 1014 into the signal from BPF 220, and the combined signal is passed to LNA 222. Additionally, in FIG. 10, digital signal generator 202 drives a third DAC 1016. The signal from DAC 1016 is filtered by a BPF/LPF 1018 and amplified by VGA 1020 to create $X_{FF2}$(t) 1022. In FIG. 10, $X_{FF2}$(t) 1022 is injected 1024 into the signal from BPF/LPF 226, and the combined signal is passed to IFA 228. In FIG. 10, digital signal generator 202 also generates cancelation signal $X_{FF3}$(t) 1026, which feeds forward into DSP 232.

FIG. 11 shows a block diagram of an exemplary radar transceiver in which an analog feedforward signal is used in the RF section of the receiver in accordance with another embodiment of the present disclosure. Specifically, in FIG. 11, digital signal generator 202 drives a second DAC 1102. The signal from DAC 1102 is filtered by a BPF/LPF 1104 and amplified by VGA 1106 to create cancelation signal $X_{FF1}$(t) 1108. In FIG. 6, $X_{FF1}$(t) 1108 is injected 1110 into the signal from BPF/LPF 226, and the combined signal is passed to IFA 228. Additionally, in FIG. 11, digital signal generator 202 drives a third DAC 1112. The signal from DAC 1112 is filtered by a BPF/LPF 1114 and amplified by VGA 1116 to create $X_{FF2}$(t) 1118. In FIG. 11, $X_{FF2}$(t) 1118 is injected 1120 into the signal from IFA 228, and the combined signal is passed to ADC 230. In FIG. 11, digital signal generator 202 also generates cancelation signal $X_{FF3}$(t) 1122, which feeds forward into DSP 232.

Several additional variations of the above approaches are possible in accordance with embodiments of the present disclosure. For example, the transceiver may have multiple upconversion stages in the transmitter, multiple downconversion stages in the receiver, or multiple upconversion stages in the feedforward path. Alternatively, the upconverters and downconverters could be replaced, if technologically appropriate, with direct RF waveform generation by the DACs or with direct RF digitization by the ADC. Also, the upconverters, downconverters, ADCs, and DACs can operate in quadrature (i.e., "IQ" mode), which presents no limitation on the above concepts. Finally, it should be noted that the individual RF and IF components, ADCs, and DACs, as well as the digital signal generator and digital signal processor, do not need to be discrete components but can be integrated as appropriate using microelectronic technology.

5. Exemplary Cancelation Signals

Numerous techniques and implementations are possible for generating cancelation signals and/or algorithms in accordance with embodiments of the present disclosure. Cancelation approaches can be static, dynamic, or a combination of static and dynamic. As an example, consider the case of static cancelation of TX-to-RX leakage in a radar system. The radar transmitter can be turned on while the antenna is pointed at the clear sky so that no target return is expected. Alternatively, in a laboratory environment, the transmitter can drive a matched load or a space hat. If the radar detects any received signal at any range (time delay) or velocity (Doppler offset), it can thus correspond to a false return from TX-to-RX leakage. Each false return can be individually suppressed by generating a software-defined waveform derived from the original transmit signal but with adjusted amplitude and phase.

For example, in an embodiment, these operations can be performed by digital signal generator 202. In an embodiment, digital signal generator 202 can be used to generate a signal (e.g., a mitigation signal) transmitted to the DAC of a cancelation signal generator used to generate a cancelation signal, such as $X_{FF}$(t) in any of the figures above (e.g., such as $X_{FF}$(t) 412). In an embodiment, digital signal generator 202 (or another processor or controller in the transceiver) can determine a signal that, when passed to the DAC, will result in the production of a cancelation signal that will cancel leakage or other interference, such as leakage or interference resulting from receiving signals when no radar return is expected. In an embodiment, digital signal generator 202 can generate multiple signals designed to individually suppress multiple detected sources of leakage and/or interference (for example, as shown in FIGS. 9-11.

In an embodiment, multiple leakage paths can be suppressed by successive cancelation of each undesired tone so that the composite feedforward waveform is the superposition of all the necessary cancelation signals. Furthermore, the transmit signal during this process can be as simple as possible, e.g., a sine wave or pulsed sine wave. The frequency of the sine wave can be adjusted to establish a transfer function at all possible frequencies so that the actual cancelation waveforms in operation would then be determined mathematically based on the carrier frequency, modulation, and frequency-dependent transfer function.

For the hierarchical approaches described in FIGS. 9-11, the algorithm could be modified to progressively determine cancelation waveforms beginning with the coarsest level of cancelation first, i.e., starting with the waveform injected closest to the antenna front end and moving progressively to the IF and DSP domains. Extending this approach to a dynamic scenario, the radar during normal operation can perform a coherent detection process at ranges, angles, and velocities for which no target return is expected. Again, any observed radar return should correspond to undesired electromagnetic energy present in the receiver. This energy can be suppressed as in the static case, but with the constraint that the cancelation process should be multiplexed with the normal radar operation. In many cases, the dynamic cancelation process can update the static cancelation waveform as needed.

In a multifunction scenario in which multiple wireless systems share the same platform, the necessary coupling information can be determined by activating transmitters and receivers sequentially to build up a matrix of transfer functions that can be used to determine the necessary cancelation waveforms based on which systems are transmitting at any given time. This software-defined cancelation technique is thus easily extended to highly complex simultaneous transmit and receive (STAR) scenarios.

Finally, it is useful to note two natural extensions of this software defined cancelation approach. First, it should be possible to use this same technique to concurrently calibrate out other undesired transceiver impairments such as distortion, IQ imbalances, spurs, intermodulation products, and DC offsets. Second, if it is possible to mitigate co-site interference among cooperating transceivers, it should also be possible to achieve some limited level of cancelation even for non-cooperating wireless systems with the caveat that the feedforward waveform would adapt dynamically to its electromagnetic environment.

6. Exemplary Advantages

Embodiments of the present disclosure have several advantages over conventional systems. For example, unlike purely analog feedforward cancelation techniques, a software-defined cancelation waveform in accordance with an embodiment of the present disclosure can cancel multiple leakage paths at the same time. Further, unlike purely digital cancelation techniques, a software-defined cancelation waveform in accordance with an embodiment of the present disclosure can cancel leakage in the receiver prior to quantization, or prior to IF amplification, or even prior to low-noise amplification. This will significantly reduce linearity constraints in high-sensitivity coherent receivers in which dynamic range is typically limited by clutter, leakage, or interferers rather than by uncorrelated noise. Embodiments of the present disclosure can blend analog, digital and software-defined approaches to maximize receiver dynamic range for the lowest possible hardware cost. Further, embodiments of the present disclosure can be extended to adaptively cancel multiple unwanted signals due to leakage, clutter, interferers or blockers.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A transceiver, comprising:

a transmitter, comprising a digital signal generator, configured to transmit a signal to a target, wherein the digital signal generator is configured to:

detect a plurality of undesired signals, generate a first mitigation signal configured to suppress a first undesired signal in the plurality of undesired signals, generate a second mitigation signal configured to suppress a second undesired signal in the plurality of undesired signals, and generate an output signal that is a combination of the first mitigation signal and the second mitigation signal;

a receiver, coupled to the transmitter, wherein the receiver is configured to receive a reflected signal reflected from the target; and a cancelation signal generator coupled to the digital signal generator and the receiver, wherein the cancelation signal generator comprises:

a digital to analog converter (DAC), coupled to the digital signal generator, wherein the DAC is configured to receive the output signal, a filter coupled to the DAC, and an amplifier coupled to the filter, wherein the amplifier is configured to output a cancelation signal, and wherein the receiver is configured to:

receive the cancelation signal, and cancel leakage in the receiver using the cancelation signal.

2. The transceiver of claim 1, wherein the cancelation signal generator further comprises:

a second filter coupled to the DAC; and a mixer coupled to an output of the second filter and to an input of the filter.

3. The transceiver of claim 1, wherein the transmitter further comprises:

a second DAC coupled to the digital signal generator;

a second filter coupled to the DAC;

a mixer coupled to the second filter;

a third filter coupled to the mixer; and a second amplifier coupled to the third filter.

4. The transceiver of claim 1, wherein the receiver comprises:

a bandpass filter (BPF) configured to receive the reflected signal;

a low noise amplifier (LNA) coupled to the BPF;

a mixer coupled to the LNA;
a low pass filter (LPF) coupled to the mixer;
an intermediate frequency amplifier (IFA) coupled to the LPF;
an analog to digital converter (ADC) coupled to the IFA; and
a digital signal processor (DSP) coupled to the ADC.

5. The transceiver of claim 4, wherein the cancelation signal generator is further configured to inject the cancelation signal into an output of the BPF, thereby generating a combined signal, and wherein the combined signal is passed to the LNA.

6. The transceiver of claim 4, wherein the cancelation signal generator is further configured to inject the cancelation signal into an output of the LPF, thereby generating a combined signal, and wherein the combined signal is passed to the IFA.

7. The transceiver of claim 4, wherein the cancelation signal generator is further configured to inject the cancelation signal into an output of the IFA, thereby generating a combined signal, and wherein the combined signal is passed to the ADC.

8. The transceiver of claim 4, further comprising a second cancelation signal generator configured to generate a second cancelation signal, wherein the cancelation signal generator is configured to inject the cancelation signal into an output of the BPF, thereby generating a first combined signal, wherein the first combined signal is passed to the LNA, and wherein the second cancelation signal generator is further configured to inject the second cancelation signal into an output of the LPF, thereby generating a second combined signal, and wherein the second combined signal is passed to the IFA.

9. The transceiver of claim 4, further comprising a second cancelation signal generator configured to generate a second cancelation signal, wherein the cancelation signal generator is configured to inject the cancelation signal into an output of the LPF, thereby generating a first combined signal, wherein the first combined signal is passed to the IFA, and wherein the second cancelation signal generator is further configured to inject the second cancelation signal into an output of the IFA, thereby generating a second combined signal, and wherein the second combined signal is passed to the ADC.

10. The transceiver of claim 9, further comprising a third cancelation signal generator coupled to the transmitter, wherein the third cancelation signal generator comprises:
a variable attenuator; and
a phase shifter coupled to the variable attenuator, wherein the phase shifter is configured to output a third cancelation signal.

11. The transceiver of claim 9, wherein the third cancelation signal generator is configured to inject the third cancelation signal into an output of the BPF, thereby generating a third combined signal, and wherein the third combined signal is passed to the LNA.

12. The transceiver of claim 1, wherein the digital signal generator is configured to:
generate a second cancelation signal; and
transmit the second cancelation signal directly to the DSP.

13. The transceiver of claim 1, wherein the digital signal generator is configured to:
detect an undesired signal that was received when the transceiver did not expect to receive a signal;
generate a mitigation signal configured to suppress the undesired signal; and
transmit the mitigation signal to the DAC.

14. The transceiver of claim 1, wherein the digital signal generator is configured to:
detect a plurality of undesired signals;
generate a first mitigation signal configured to suppress a first undesired signal in the plurality of undesired signals; and
generate a second mitigation signal configured to suppress a second undesired signal in the plurality of undesired signals.

15. The transceiver of claim 14, wherein the digital signal generator is further configured to:
transmit the first mitigation signal to the DAC.

16. The transceiver of claim 15, wherein the digital signal generator is further configured to:
transmit the second mitigation signal to a second cancelation signal generator.

17. A transceiver, comprising:
a transmitter, comprising a digital signal generator, configured to transmit a signal to a target, wherein the digital signal generator is configured to:
generate a first mitigation signal configured to suppress a first undesired signal in the plurality of undesired signals in response to a determination that the first undesired signal was received by the transceiver,
generate a second mitigation signal configured to suppress a second undesired signal in the plurality of undesired signals in response to a determination that the second undesired signal was received by the transceiver, and
generate an output signal that is a combination of the first mitigation signal and the second mitigation signal;
a receiver, coupled to the transmitter, wherein the receiver is configured to receive a reflected signal reflected from the target; and
a cancelation signal generator coupled to the digital signal generator and the receiver, wherein the cancelation signal generator comprises:
a digital to analog converter (DAC) coupled to the digital signal generator, wherein the DAC is configured to receive the output signal,
a filter coupled to the DAC, and
an amplifier coupled to the filter, wherein the amplifier is configured to output a cancelation signal derived from the mitigation signal, and wherein the receiver is configured to:
receive the cancelation signal, and
cancel the undesired signal using the cancelation signal.

18. A transceiver, comprising:
a transmitter, comprising a digital signal generator, configured to transmit a signal to a target, wherein the digital signal generator is configured to:
detect a plurality of undesired signals,
generate a first mitigation signal configured to suppress a first undesired signal in the plurality of undesired signals,
generate a second mitigation signal configured to suppress a second undesired signal in the plurality of undesired signals, and
generate an output signal that is a combination of the first mitigation signal and the second mitigation signal;
a receiver, coupled to the transmitter, wherein the receiver is configured to receive a reflected signal reflected from the target, and wherein the receiver comprises:

a bandpass filter (BPF) configured to receive the reflected signal, a low noise amplifier (LNA) coupled to the BPF, a mixer coupled to the LNA, a low pass filter (LPF) coupled to the mixer, an intermediate frequency amplifier (IFA) coupled to the LPF, an analog to digital converter (ADC) coupled to the IFA, and a digital signal processor (DSP) coupled to the ADC, and a cancelation signal generator coupled to the digital signal generator and the receiver, wherein the cancelation signal generator comprises:

a digital to analog converter (DAC) coupled to the digital signal generator, wherein the FAC is configured to receive the output signal, a filter coupled to the DAC, and an amplifier coupled to the filter, wherein the amplifier is configured to output a cancelation signal, and wherein the receiver is configured to:

receive the cancelation signal, and cancel leakage in the receiver using the cancelation signal.

19. The transceiver of claim 18, further comprising a second cancelation signal generator configured to generate a second cancelation signal, wherein the cancelation signal generator is configured to inject the cancelation signal into an output of the BPF, thereby generating a first combined signal, wherein the first combined signal is passed to the LNA, and wherein the second cancelation signal generator is further configured to inject the second cancelation signal into an output of the LPF, thereby generating a second combined signal, and wherein the second combined signal is passed to the IFA.

20. The transceiver of claim 18, further comprising a second cancelation signal generator configured to generate a second cancelation signal, wherein the cancelation signal generator is configured to inject the cancelation signal into an output of the LPF, thereby generating a first combined signal, wherein the first combined signal is passed to the IFA, and wherein the second cancelation signal generator is further configured to inject the second cancelation signal into an output of the IFA, thereby generating a second combined signal, and wherein the second combined signal is passed to the ADC.

* * * * *